(12) United States Patent  
Payne

(10) Patent No.: US 9,002,864 B1
(45) Date of Patent: Apr. 7, 2015

(54) CROSS-PLATFORM CONVERSION OF ENCODED MOBILE APP STORE LINKS

(75) Inventor: Charles Andrew Payne, Los Angeles, CA (US)

(73) Assignee: Symantec Corporation, Mountain View, CA (US)

( * ) Notice: Subject to any disclaimer, the term of this patent is extended or adjusted under 35 U.S.C. 154(b) by 405 days.

(21) Appl. No.: 13/462,602

(22) Filed: May 2, 2012

(51) Int. Cl.
*G06F 17/30* (2006.01)

(52) U.S. Cl.
CPC .... *G06F 17/30876* (2013.01); *G06F 17/30386* (2013.01)

(58) Field of Classification Search
CPC .............. G06F 17/30386; G06F 17/30887; G06F 17/30876; G06Q 30/0267
USPC .......................................... 707/736, 769, 756
See application file for complete search history.

(56) References Cited

U.S. PATENT DOCUMENTS

2007/0061242 A1* 3/2007 Ramer et al. .................. 705/37
2014/0006434 A1* 1/2014 Chervirala et al. .......... 707/758

\* cited by examiner

*Primary Examiner* — Jensen Hu
(74) *Attorney, Agent, or Firm* — Brill Law Office; Jeffrey Brill

(57) ABSTRACT

A mobile computing device that runs a first mobile operating system scans and decodes an encoded link to a specific page in an app distribution site for a second mobile operating system. The mobile computing device can convert the link into a format usable by the first mobile operating system, and use the converted link to access and display the specific page. Rather than display the page in the app distribution site for the second mobile operating system, one or more links to corresponding apps in the format of the first mobile operating system can be located and displayed. To do so, the decoded link is used to glean relevant search terms, which are used to search an app distribution site for the first mobile operating system. The search results are displayed to the user.

15 Claims, 4 Drawing Sheets

CROSS-PLATFORM CONVERSION OF ENCODED MOBILE APP STORE LINKS

TECHNICAL FIELD

This disclosure pertains generally to mobile computing devices, and more specifically to cross-platform conversion of links to mobile app store pages embedded in QR codes.

BACKGROUND

Mobile computing devices such as smartphones and tablet computers are becoming more widely used every day. Android is an open-source, Linux based operating system for such mobile devices that is gaining an increasingly prevalent market share. A large community of developers write applications ("apps") that run on Android devices. Many of these apps are available either for purchase or for free through the online Android Market, which is run by Google. Android apps can also be downloaded from other online stores and additional third-party sites.

There are other popular mobile operating systems in addition to Android. For example, Apple's iOS (formerly known as iPhone OS) is a mobile operating system that runs on Apple mobile devices such as the iPhone, the iPod Touch and the iPad. Many applications ("apps") for iOS are available for download from Apple's App Store. Windows Phone is a mobile operating system developed by Microsoft, which runs on smartphones from vendors such as Nokia, Acer and Fujitsu. Users can download apps for Windows Phone from the Windows Phone Marketplace, which is run by Microsoft.

An app for one mobile operating system cannot run on another (for example, an Android app cannot run on an iPhone or a Windows Phone). In some cases, separate versions of a given app are developed for multiple target mobile operating systems. For example, both an Android version and an iOS version of the same app might be developed. Other apps are available for a single mobile operating system only, although apps that perform similar functions may be available for other platforms.

Quick Response ("QR") Codes are a type of matrix barcode, which consist of black marking arranged in a square pattern on a white background. A QR code is quickly readable by a scanner, and can encode virtually any kind of data. Many mobile computing devices include an application that uses the onboard camera to scan QR codes. QR codes are widely used today to encode data to be scanned and processed by mobile computing devices. For example, QR codes are often used to encode Uniform Resource Locators ("URLs") for convenient scanning by mobile devices, such that a mobile device can scan the QR code and automatically link to the webpage pointed to by the encoded URL. This does not require the user to do anything more than point the device at the QR code and activate the QR code scanning application (e.g., by pressing a button on the device). Thus, for example, print materials such as advertisements or product packaging can contain QR codes that resolve to web pages with more information or other online functionality concerning corresponding products or subject matter.

One new URL scheme that has been constructed to leverage QR code scanning on mobile devices is used to encode URLs that resolve to specific pages on the Android Market. Called market scheme URLs, this scheme allows a user with an Android device to scan a QR code, and automatically have the device link to the Android Market page for a specific Android application or publisher. The market scheme uses a prefix of "market://" for the URL. For example, suppose that a specific Android app called appname had a dedicated Android Market page, and that the standard URL pointing to that page was of the form http://market.android.com/details?id=com.pub.appname. The market scheme URL that could be encoded in a QR code linking to the app page on Android Market would be market://details?id=com.pub.appname.

Useful though they are, there are two problems with these market scheme URLs. First, they are not standard URLs that can be handled by common web browsers. In other words, these special links are not in the format of a standard URL, and are thus not supported by non-Android platforms. Although Android QR code scanning applications are programmed to manage these special links, QR code scanning applications and mobile browsers for other mobile operating systems are not. As a result, a user of a non-Android mobile device who scans a market link QR code will not be able to launch the corresponding Android Market page using the mobile device's browser.

The second problem is that for a user running a different mobile platform, such as iOS, landing on the Android Market page pointed to by the encoded market URL is not likely a desirable end result of scanning such a QR code in the first place. This is the case because the user likely scanned the QR code to learn more about and/or download the app being described in association with the QR code. However, the Android app available from the resulting Android Market page will not run on the user's non-Android mobile device. If a user scans a QR code that points to an Android Market page for a particular app, then the user might reasonably prefer to be taken to a page concerning a version of the app (or a similar app) that is compatible with the device the user has, such as the (iOS) App Store or Windows Phone Marketplace.

It would be desirable to address these issues.

SUMMARY

A cross-platform encoded link management system enables a user of a mobile computing device that runs a first mobile operating system such as iOS to process encoded links to app distribution site pages for a second mobile operating system, such as Android. The mobile computing device that runs the first mobile operating system (e.g., an iPhone) scans an encoded link to a specific page in the app distribution site for the second mobile operating system (e.g., Android Market). The encoded link can be in the form of, for example, a QR code encoding an Android Market scheme URL. The specific page in the app distribution site pertains to a specific app in the format of the second mobile operating system, such as a specific Android app. The mobile computing device that runs the first mobile operating system decodes the scanned encoded link.

At this point, in one embodiment the mobile computing device that runs the first mobile operating system (e.g., the iPhone) converts the link in the format specific to the second mobile operating system into a link to the same target in a format usable by the first mobile operating system. In one embodiment, this comprises converting an Android Market scheme URL pointing to a specific page in Android Market to a standard URL pointing to the same page. The mobile computing device uses the converted URL to link to the specific page in the app distribution site. The mobile computing device that runs the first mobile operating system is thus able to display the specific page in the app distribution site for the second mobile operating system to the user.

In another embodiment, rather than display the page in the app distribution site for the second mobile operating system (e.g., Android Market), one or more links to corresponding apps in the format of the first mobile operating system are located and displayed. To do so, at least one search term is gleaned for locating one or more apps in the format of the first mobile operating system corresponding to the specific app in the format of the second mobile operating system. This can comprise gleaning one or more search terms from the decoded link itself, for example where the name of the specific app is present in a decoded URL. In another embodiment, the decoded link is used to navigate to the target page, and search terms are gleaned from there, for example from the page text, page content, page heading, page title and/or markup language description of the page.

The gleaned search terms are used to search the app distribution site for the first mobile operating system (e.g., the iOS App Store). This search locates at least one app in the format of the first mobile operating system corresponding to the specific app in the format of the second mobile operating system. In one embodiment, the search generates only a single search result, which comprises a link to a specific page for an app in the format of the first mobile operating system corresponding to the specific app in the format of the second mobile operating system. In this scenario, the located specific page is displayed to the user. In another embodiment, the search generates a plurality of separate search results, each separate search result comprising a link to a separate page for a separate app in the format of the first mobile operating system corresponding to the specific app in the format of the second mobile operating system. In this scenario, the multiple search results are displayed to the user. In some embodiments, the search results are augmented, for example by displaying reviews of each separate app, displaying empirical data concerning app selections made by other users, prompting the user to refine the search and/or reordering the search results.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Figure 1:
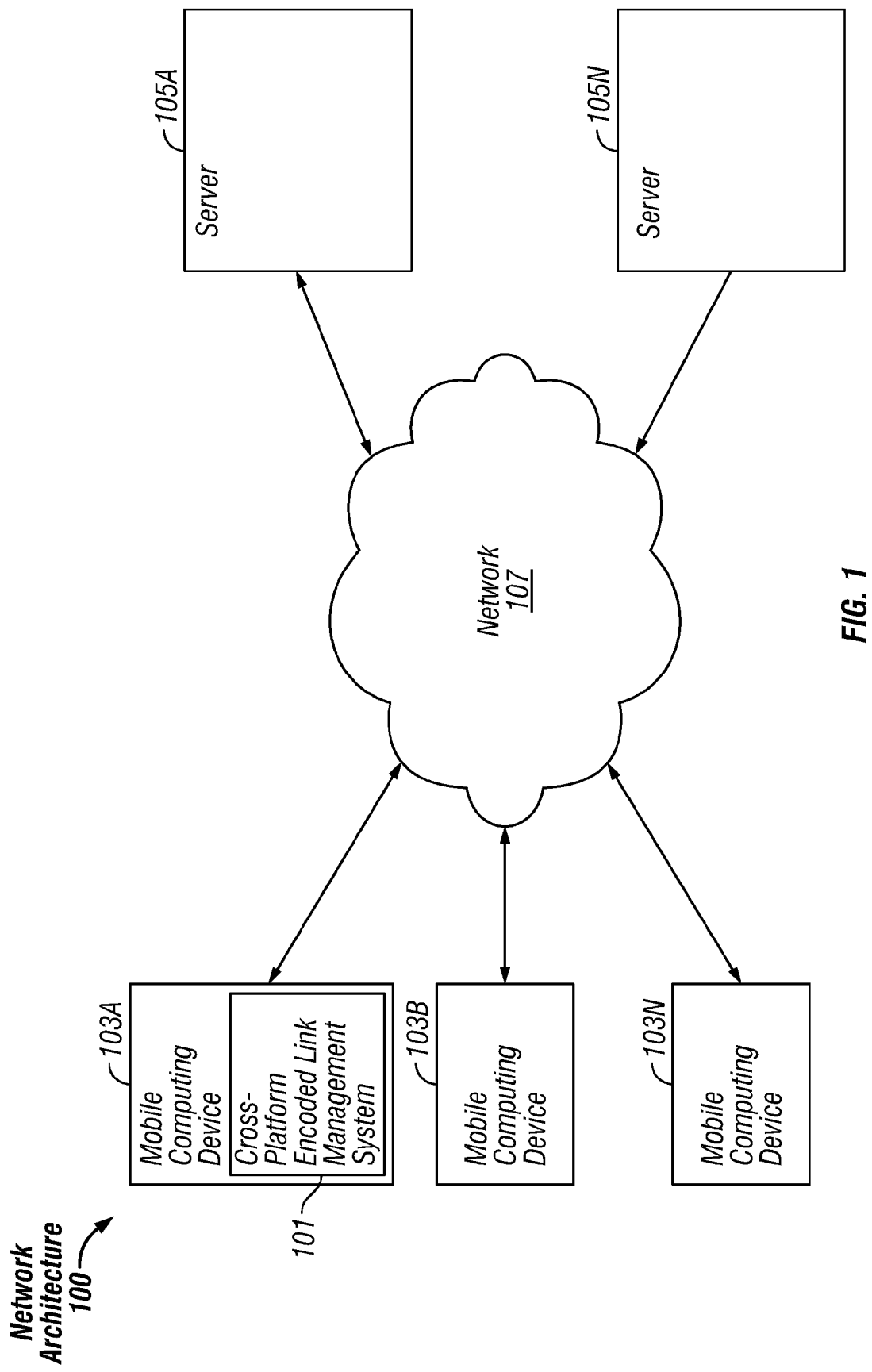
FIG. 1 is a block diagram of an exemplary network architecture in which a cross-platform encoded link management system can be implemented, according to some embodiments.

FIG. 1 is a block diagram illustrating an exemplary network architecture 100 in which a cross-platform encoded link management system 101 can be implemented. The illustrated network architecture 100 comprises multiple mobile computing devices 103A, 103B and 103N, as well as multiple servers 105A and 105N. In FIG. 1, the cross-platform encoded link management system 101 is illustrated as residing on mobile computing device 103A. It is to be understood that this is an example only, and in various embodiments various functionalities of this system 101 can be instantiated on a mobile computing device 103, a server 105 or can be distributed between multiple computing devices as desired.

It is to be understood that the mobile computing devices 103 described herein comprise portable computer systems 210 capable of connecting to a network 107 and running applications (such mobile computing devices 103 are sometimes referred to as smartphones, although many mobile phones not so designated also have these capabilities). Mobile computing devices 103 and servers 105 can be implemented using computer systems 210 such as the one illustrated in FIG. 2 and described below. The mobile computing devices 103 and servers 105 are communicatively coupled to a network 107, for example via a network interface 248 as described below in conjunction with FIG. 2. Mobile computing devices 103 are able to access applications and/or data on servers 105 using, for example, a web browser or other client software (not shown).

Although FIG. 1 illustrates three mobile computing devices 103 and two servers 105 as an example, in practice many more (or fewer) mobile computing devices 103 and/or servers 105 can be deployed. In one embodiment, the network 107 is in the form of the internet. Other networks 107 or network-based environments can be used in other embodiments.

Figure 2:
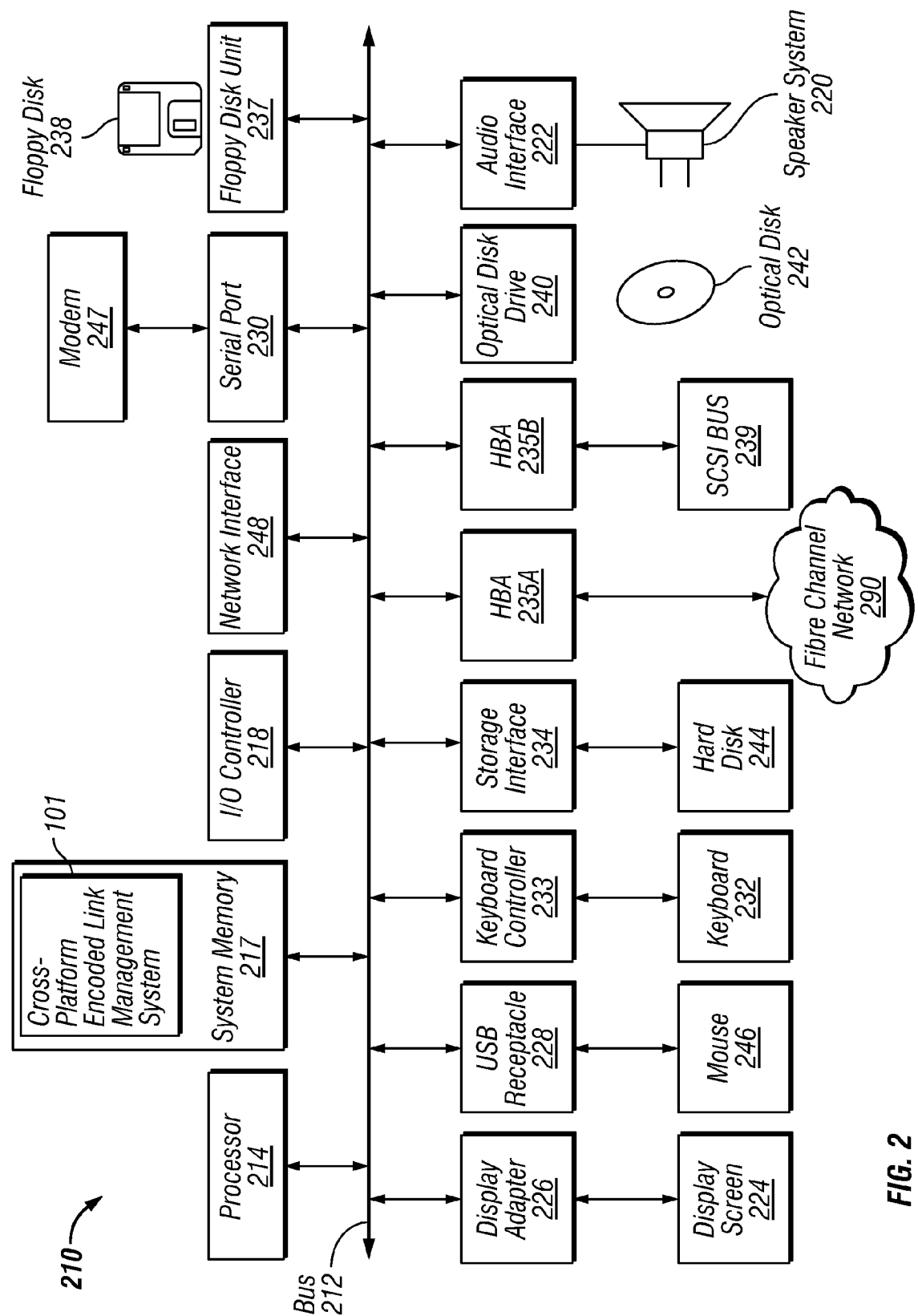
FIG. 2 is a block diagram of a computer system suitable for implementing a cross-platform encoded link management system, according to some embodiments.

FIG. 2 is a block diagram of a computer system 210 suitable for implementing a cross-platform encoded link management system 101. Both mobile computing devices 103 and servers 105 can be implemented in the form of such computer systems 210. As illustrated, one component of the computer system 210 is a bus 212. The bus 212 communicatively couples other components of the computer system 210, such as at least one processor 214, system memory 217 (e.g., random access memory (RAM), read-only memory (ROM), flash memory), an input/output (I/O) controller 218, an audio output interface 222 communicatively coupled to an external audio device such as a speaker system 220, a display adapter 226 communicatively coupled to an external video output device such as a display screen 224, one or more interfaces such as serial ports 230, Universal Serial Bus (USB) receptacles 230, parallel ports (not illustrated), etc., a keyboard controller 233 communicatively coupled to a keyboard 232, a storage interface 234 communicatively coupled to at least one hard disk 244 (or other form(s) of magnetic media), a floppy disk drive 237 configured to receive a floppy disk 238, a host bus adapter (HBA) interface card 235A configured to connect with a Fibre Channel (FC) network 290, an HBA interface card 235B configured to connect to a SCSI bus 239, an optical disk drive 240 configured to receive an optical disk 242, a mouse 246 (or other pointing device) coupled to the bus 212 e.g., via a USB receptacle 228, a modem 247 coupled to bus 212, e.g., via a serial port 230, and a network interface 248 coupled, e.g., directly to bus 212.

Other components (not illustrated) may be connected in a similar manner (e.g., document scanners, digital cameras, printers, etc.). Conversely, all of the components illustrated in FIG. 2 need not be present. The components can be interconnected in different ways from that shown in FIG. 2.

The bus 212 allows data communication between the processor 214 and system memory 217, which, as noted above may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs can be stored on a local computer readable medium (e.g., hard disk 244, optical disk 242) and loaded into system memory 217 and executed by the processor 214. Application programs can also be loaded into system memory 217 from a remote location (i.e., a remotely located computer system 210), for example via the network interface 248 or modem 247. In FIG. 2, the cross-platform encoded link management system 101 is illustrated as residing in system memory 217. The workings of the cross-platform encoded link management system 101 are explained in greater detail below in conjunction with FIG. 3.

The storage interface 234 is coupled to one or more hard disks 244 (and/or other standard storage media). The hard disk(s) 244 may be a part of computer system 210, or may be physically separate and accessed through other interface systems.

The network interface 248 and or modem 247 can be directly or indirectly communicatively coupled to a network 107 such as the Internet. Such coupling can be wired or wireless.

Figure 3:
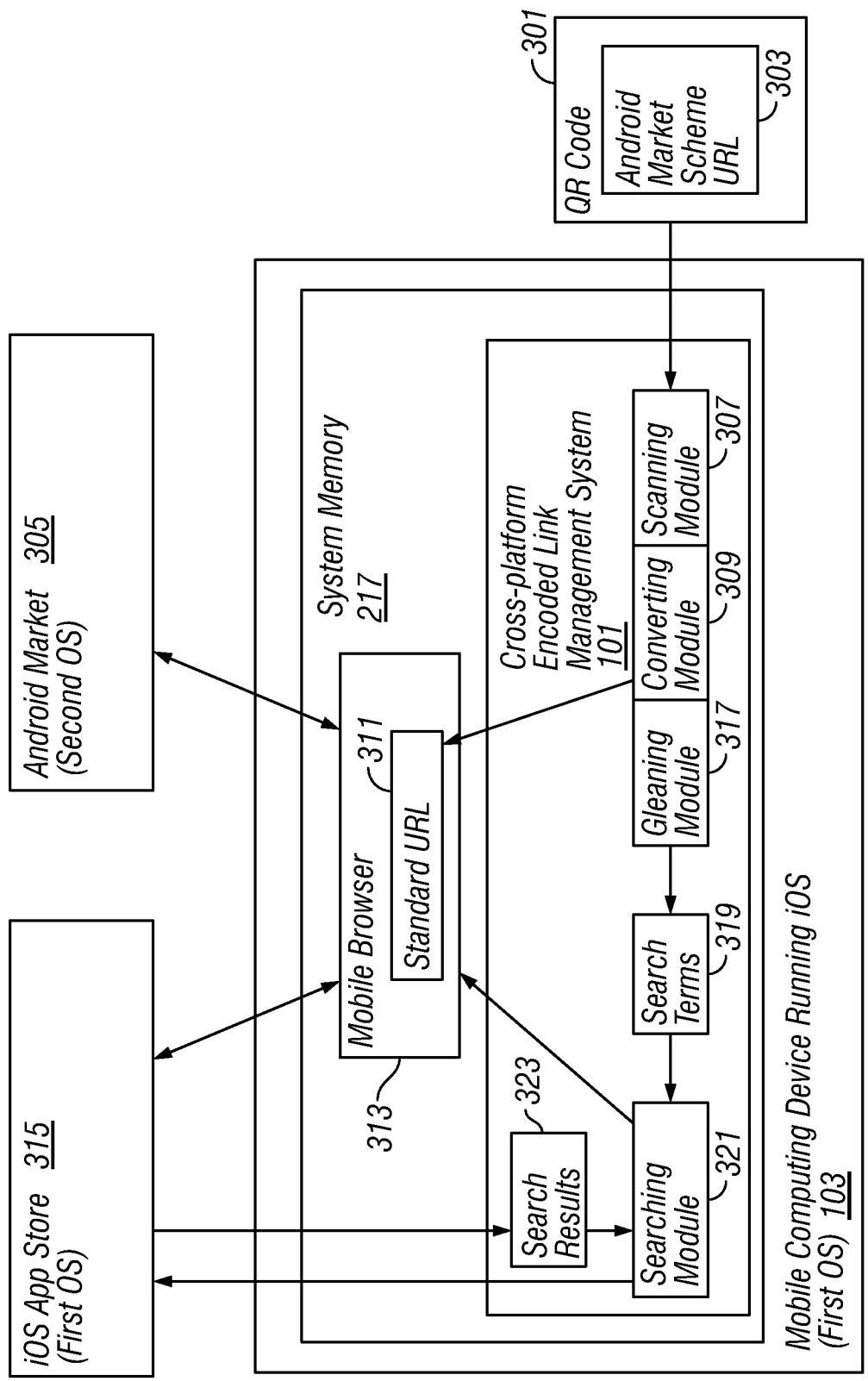
FIG. 3 is a block diagram of the operation of a cross-platform encoded link management system, according to some embodiments.

FIG. 3 illustrates the operation of a cross-platform encoded link management system 101, according to some embodiments. As described above, the functionalities of the cross-platform encoded link management system 101 can reside on a mobile computing device 103, a server 105, or be distributed between multiple computer systems 210, including within a cloud-based computing environment in which the functionality of the cross-platform encoded link management system 101 is provided as a service over a network 107. It is to be understood that although the cross-platform encoded link management system 101 is illustrated in FIG. 3 as a single entity, the illustrated cross-platform encoded link management system 101 represents a collection of functionalities, which can be instantiated as a single or multiple modules as desired (an instantiation of specific, multiple modules of the cross-platform encoded link management system 101 is illustrated in FIG. 3). It is to be understood that the modules of the cross-platform encoded link management system 101 can be instantiated (for example as object code or executable images) within the system memory 217 (e.g., RAM, ROM, flash memory) of any computer system 210, such that when the processor 214 of the computer system 210 processes a module, the computer system 210 executes the associated functionality. As used herein, the terms "computer system," "computer," "client," "client computer," "server," "server computer" and "computing device" mean one or more computers configured and/or programmed to execute the described functionality. Additionally, program code to implement the functionalities of the cross-platform encoded link management system 101 can be stored on computer-readable storage media. Any form of tangible computer readable storage medium can be used in this context, such as magnetic or optical storage media. As used herein, the term "computer readable storage medium" does not mean an electrical signal separate from an underlying physical medium.

In the embodiment illustrated in FIG. 3, a cross-platform encoded link management system 101 resides in the system memory 217 of a non-Android based mobile computing device 103. Some examples of non-Android based mobile computing devices 103 are iPhones, iPads and Windows Phones, although other non-Android based mobile computing devices 103 can be used in other embodiments. In one embodiment, the cross-platform encoded link management system 101 is instantiated in the form of a mobile device app, such as a QR code scanner. In other embodiments, the functionality of the cross-platform encoded link management system 101 is instantiated in the form of multiple apps, and/or another/other type(s) of apps. As illustrated in FIG. 3, the cross-platform encoded link management system 101 enables users of non-Android mobile devices 103 to utilize QR codes 301 that encode links to the Android Market 305.

As noted above, Android Market scheme URLs 303 encoded in QR codes 301 are not standard URLs 311, so a user operating a non-Android mobile device 103 who scans one cannot link to the target. In other words, conventional non-Android QR code scanners and mobile browsers cannot process non-standard, market scheme URLs 303. To address this problem, a QR code scanning module 307 of the cross-platform encoded link management system 101 scans a QR code 301 that encodes an Android Market scheme URL 303 that points to a page in the Android Market 305. The QR code scanning module 307 decodes the scanned QR code, resulting in the Android Market scheme URL 303. A link converting module 309 of the cross-platform encoded link management system 101 converts the non-standard, Android Market scheme URL 303 into standard URL 311.

The implementation mechanics of converting a non-standard URL 303 in a specific format to a standard URL 311 can vary depending upon the exact format of the non-standard URL 303 and the content of the target. For example, the current format of an Android Market scheme URL 303 is to use the prefix "market://" and omit the top level domain (i.e., the Android Market domain) which is implicit, as the link itself is an Android Market scheme URL 303. Thus, the link converting module 309 changes the prefix from "market://", which is market scheme specific, to "http://", which is the prefix of a standard URL 311. It is to be understood that the specific non-standard prefix to replace and the specific standard prefix with which to replace it can change or vary as the formats of non-standard URLs 303 to convert and/or standard URLs 311 into which to convert them change or vary.

In addition to changing the prefix, the link converting module 309 appends the top level domain to the right of the prefix. Because the market scheme URL 303 is being converted into a standard URL 311, the top level domain can no longer be implied, but must be explicitly included in the standard URL 311. Thus, for example, where the top level domain of the Android Market is "market.android.com", the link converting module 309 would append "market.android.com" to "http://", resulting in "http://market.android.com", which would be a URL pointing to the top level domain of the Android Market. It is to be understood that the specific content of the top level domain can vary or change, and that "market.android.com" is just an example. The top level domain of the Android Market itself can change over time (e.g., to "play.google.com/store/apps" or "android-market.co") as well as vary between countries or otherwise. Additionally, as explained in greater detail below, Android Market is just one example of a target of non-standard URLs 303 that could be encoded in QR codes 301, and different targets would have different top level domains.

In addition to appending the top level domain to the right of the prefix, the link converting module 309 appends any publisher and app specific content in the non-standard market scheme URL 303 to the right of the top level domain. For example, in the Android Market scheme URL 303 "market://details?id=com.rovio.angrybirds", the content "details?id=com.rovio.angrybirds" is specific to the publisher and app. Thus, when converting the market scheme URL 303 to a standard URL 311, the link converting module 309 would append "details?id=com.rovio.angrybirds" to the right of "http://market.android.com" thereby creating "http://market.android.com/details?id=com.rovio.angrybirds". This result is the URL 311 of the Android Market Angry Birds page.

As noted above, the format and/or content of the non-standard URL 303 to be converted can change or vary, as well as the format and/or content of the target, and for that matter, the format and/or content of standard URLs 311 themselves. Any such changes can be taken into account by the link converting module 309 in its conversion of non-standard URLs 303 into standard URLs 311.

Once the link converting module 309 has created a standard URL 311 based on the non-standard URL 303 encoded in the QR code 301, the link converting module 309 passes the standard URL 311 to the mobile browser 313 on the user's non-Android based mobile device 103, so that the mobile browser 313 can link to the target (e.g., the Android Market page for the app associated with the scanned QR code 301). Because the link converting module 309 has created a standard URL 311, the mobile browser 313 on the non-Android based mobile device 103 can link to and display the target page.

The above description uses Android Market as a specific example of a target, links to which are encoded in QR codes 301. In other embodiments, non-standard URLs 303 in a format other than Android Market scheme could be encoded in QR codes 301, linking to specific pages in application distribution sites 315 for mobile operating systems other than Android. In such embodiments, versions of the cross-platform encoded link management system 101 run on mobile devices 103 running mobile operating systems other than the one targeted by the links, and convert the non-standard format URLs 303 to standard ones as described above. For example, in one embodiment, non-standard URLs 303 linking to specific pages for iOS Apps in the App Store could be encoded in QR codes 301. In that embodiment, a version of the cross-platform encoded link management system 101 could run on, e.g., Android-based mobile computing devices 103, and convert the iOS specific non-standard URLs 303 into standard URLs 311 that can be processed by the Android-based mobile browser 313. Non-standard URLs 303 targeting other mobile operating systems such as Windows Phone can be converted into standard URLs 311 in other embodiments.

The above-described embodiments are very effective at enabling a user of, e.g., a non-Android mobile device 103 to automatically link to, e.g., Android Market pages pointed to by non-standard URLs 303 encoded in QR codes 301. However, in some cases a user operating a non-Android mobile device 103 may prefer linking not to the target page in Android Market 305, but instead to a page in an app distribution site 315 for the mobile operating system that the user's device 103 is actually running. For example, a user of an iPhone who scans a QR code 301 concerning, e.g., Angry Birds, may not wish to link to the Angry Birds page in Android Market 305, which is what the market scheme link 303 encoded in the scanned QR code 301 points to, but instead to the Angry Birds page in the iOS App Store 315, from which the user can download the Angry Birds App for iOS, which is what will run on the user's iPhone.

In some cases, there is a version of the app in the native format of the user's mobile device 103 (e.g., iOS) from the same publisher, as in the example of Angry Birds described above. In other words, for some Android apps referenced by Android Market scheme URLs 303 encoded in a scanned QR code 301, a corresponding version of the app exists for iOS (or for Windows Phone, or for whatever specific mobile operating system is running on the user's mobile device 103). In other instances, no such corresponding version of the app from the same publisher exists, but one or more corresponding similar apps exist in the native format of the user's mobile device 103. Corresponding similar apps can be in the form of apps that perform the same functionality, have the same or similar features, etc. For example, suppose a QR 301 encodes a link to a page for a specific Android-based mortgage calculator from a specific publisher that does not publish a corresponding iOS version. Although no iOS version of the specific mortgage calculator from the specific publisher exists, other mortgage calculator iOS apps would be available from other publishers.

In either case, a search term gleaning module 317 of the cross-platform encoded link management system 101 gleans search terms 319 to be used to search the app distribution site 315 for the target platform (e.g., the iOS app store) for one or more corresponding apps. More specifically, the search term gleaning module 317 assembles search terms 319 that can be used to search the platform specific app distribution site 315 for one or more apps that correspond to the, e.g., Android app that is pointed to by the non-standard URL 303 encoded in the scanned QR code 301.

In different embodiments, the search terms 319 in question can be gleaned from different sources. For example, in some instances the search term gleaning module 317 can capture the search terms 319 from the Android Market scheme URL 303 encoded in the QR code 301. This is often the case where the same publisher has versions of the app for both platforms, e.g., Android and iOS. The name of the app is typically present in the non-standard (e.g., Android Market scheme) URL 303, and can be parsed therefrom. As an example, take the scenario described above in which the app is Angry Birds, and a version thereof exists for both Android and iOS. The Android Market scheme URL 303 encoded in the QR code 301 contains the text "angrybirds". The search term gleaning module 317 can be configured to leverage the format of an Android Market scheme URL 303 to extract the name of the app, which appears at a specific position therein, e.g., relative to other text in the non-standard URL 303. As explained in more detail below, a search is then made for the name of the app (e.g., angry birds) on the platform specific app distribution site 315 for the platform of the user's mobile device 103 (e.g., the iOS App Store). Where a corresponding version of the app is available for that platform, such a search typically results in the page on platform specific distribution site 315 for that app. In other embodiments, search terms 319 other than or in addition to the app name can be gleaned from the non-standard URL 303 encoded in the QR code 301, such as the name of the publisher.

In other scenarios, the content of the non-standard URL 303 encoded in the QR code 301 is not sufficient to yield search terms 319 for locating a native format app for the user, for example where no exact native format match of the app from the same publisher exists, but corresponding similar apps may be present. In such cases, the search term gleaning module 317 can glean search terms 319 from the page pointed to by the non-standard URL 303 encoded in the QR code 301. To do so, the cross-platform encoded link management system 101 can use the functionality described above to convert the non-standard URL 303 into a standard URL 311 and link to the page to which it points. However, instead of displaying that page to the user, the search term gleaning module 317 uses it as a source from which to glean search terms 319. This can take the form of the search term gleaning module 317 gleaning search terms 319 from the text of the page itself, from the page heading, from the Hypertext Markup Language ("HTML") or other markup language describing the page, or from other pieces or components of the page. For example, the page title, when stripped of extra information such as, e.g., the suffix "-Android Market", can be used as a search term 319. In other cases, page heading elements and/or other HTML elements may be used as search terms 319. In other embodiments, words or phrases that appear on the page with requisite frequencies, at specific positions, or at given proximities to other content are used as search terms 319. It is to be understood that in different embodiments, the search term gleaning module 317 gleans search terms 319 from the non-standard URL 303 and/or its target page at various levels of granularity, as desired.

A searching module 321 of the cross-platform encoded link management system 101 can use the gleaned search terms 319 to search the platform specific distribution site 315. To do so, the searching module 321 typically utilizes search functionality provided by the platform specific distribution site 315. For example, the iOS App Store, Android Market and Windows Phone Marketplace each provide a search engine configured to search the respective site 315. In some embodiments, the searching module 321 links to the URL of the desired distribution site 315 based search engine, and includes the search term(s) 319 in the URL as a parameter. For example, in the case where the searching module 321 is to search the iOS App Store 315 for apps by the publisher Rovio Entertainment Ltd. by using the search term "Rovio", the following URL could be used: http://phobos.apple.com/WebObjects/MZSearch.woa/wa/search?WOURLEncoding= ISO8859_1&lang=1&output=lm&country=US&term= Rovio&media=software. Linking to this URL results in performing the desired search of the iOS App Store 315. In other embodiments, the searching module 321 can pass the search terms 319 to the search engine associated with the native format app distribution site 315 in other ways, as desired.

Some searches generate a single result 323, in which case the searching module 321 can simply provide the URL 311 of the search result 323 to the browser 313 on the user's mobile computing device 103, so as to display the resulting page to the user. This could be the case where, for example, a corresponding version of the app from the same publisher is available. Other searches generate multiple results 323, for example in the scenario in which no exact match of the app exists for the target platform, but a number of corresponding similar apps from other publishers are found. In this scenario, in one embodiment multiple search results 323 are displayed to the user, who can either choose specific results 323 of interest or refine the search by entering additional or limiting search terms 319. In other embodiments, the cross-platform encoded link management system 101 annotates or otherwise further processes the search results 323, for example by finding reviews of the different apps pointed to by the search results 323 and providing the user with links to the reviews. In another embodiment, the cross-platform encoded link management system 101 reorders the search results 323. The search engine on the platform specific app distribution site 315 (e.g., the App Store) returns the search results 323 in a given order, but in this embodiment the cross-platform encoded link management system 101 reworks that order based on other criteria, such as reviews, ratings, popularity, etc.

In one embodiment, the cross-platform encoded link management system 101 tracks empirical data concerning user choices. For example, the cross-platform encoded link management system 101 can track which search results 323 (links to apps) are ultimately chosen by users who scan given QR codes 301 encoding non-standard URLs 303 for given apps. This empirical data can then be used to make recommendations to users and/or reorder search results 323.

In different embodiments, the cross-platform encoded link management system 101 performs varying amounts of processing of the search results 323. At one end of the spectrum, the cross-platform encoded link management system 101 simply provides the user with the raw search results 323, without doing any additional processing. In other embodiments, the cross-platform encoded link management system 101 can automatically take the user to the page it concludes the user wants, annotate or otherwise process the search results 323 and present them to the user that way, glean additional data about the search results 323, etc.

Two separate scenarios are described above for allowing a user of a mobile device 103 running one operating system (e.g., an iPhone running iOS) to scan and process QR codes 301 encoding non-standard URLs 303 pointing to pages in an app distribution site for another mobile platform (e.g., the Android Market 305). As explained in detail above, in one scenario, the cross-platform encoded link management system 101 converts the non-standard URL 303 to a standard one which can be processed by the user's mobile device, thereby taking the user to page in the, e.g., Android Market 305, pointed to by the encoded non-standard URL 303. In the other scenario, the cross-platform encoded link management system 101 gleans search terms 319 and executes a search for corresponding apps in the native format of the user's mobile device 103.

In one embodiment, the cross-platform encoded link management system 101 prompts the user as to which scenario s/he would prefer (e.g., "The QR Code that you have scanned points to a page in the Android Market for a specific App. You are using an iPhone. Would you prefer to view the page in the Android Market, or a page in the App Store for a Similar App?"). In another embodiment, the cross-platform encoded link management system 101 defaults to one scenario or the other. In one embodiment, the cross-platform encoded link management system 101 defaults to the second scenario, but reverts to the first if the search results 323 do not meet a specific threshold quantifying desirability. In another embodiment, the cross-platform encoded link management system 101 displays summaries of results of both options, and provides the user with a choice of links. Additionally, the cross-platform encoded link management system 101 can prompt the user as to a choice of target mobile platform in a case where more than one option could be desirable based on the user's hardware platform (e.g., Android or Microsoft Phone).

Figure 4:
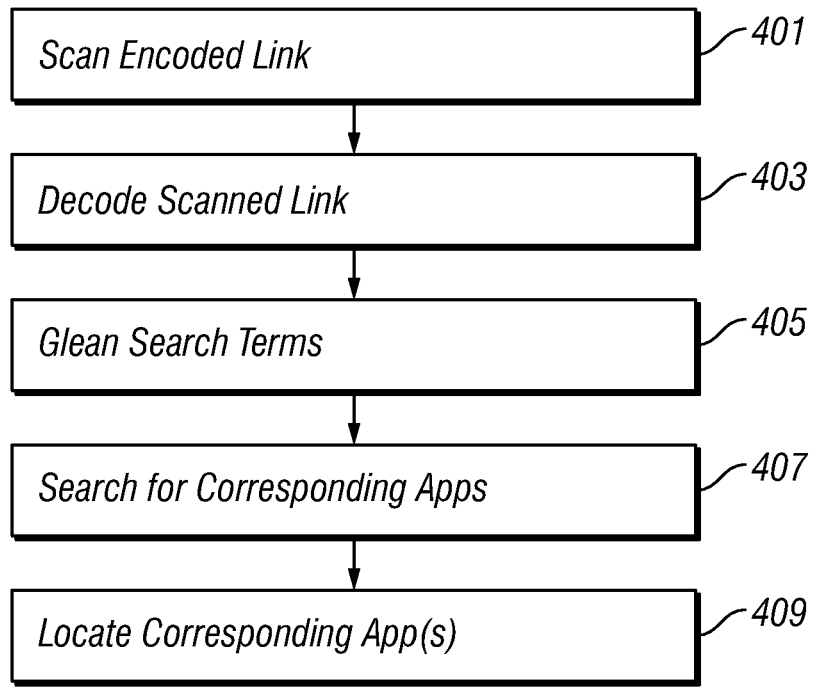
FIG. 4 is a flowchart of the operation of a cross-platform encoded link management system, according to some embodiments.

FIG. 4 is a flowchart of the operation of a cross-platform encoded link management system 101, according to some embodiments. As illustrated in FIG. 4, the scanning module 307 of the cross-platform encoded link management system 101 on the mobile computing device 103 running a first mobile operating system scans 401 and decodes 403 an encoded link to a specific page in the app distribution site 305 for the second mobile operating system. (The specific page of the app distribution site 305 pertains to a specific app in a format of the second mobile operating system.) The search term gleaning module 317 gleans 405 one or more search terms 319 for locating one or more apps in the format of the first mobile operating system that correspond to the specific app in the format of the second mobile operating system. The searching module 321 searches 407 the app distribution site 315 of the first mobile operating system for the gleaned search terms 319. Responsive to the search, the searching module 321 locates 409 one or more apps in the format of the first mobile operating system corresponding to the specific app in the format of the second mobile operating system.

Figure 5:
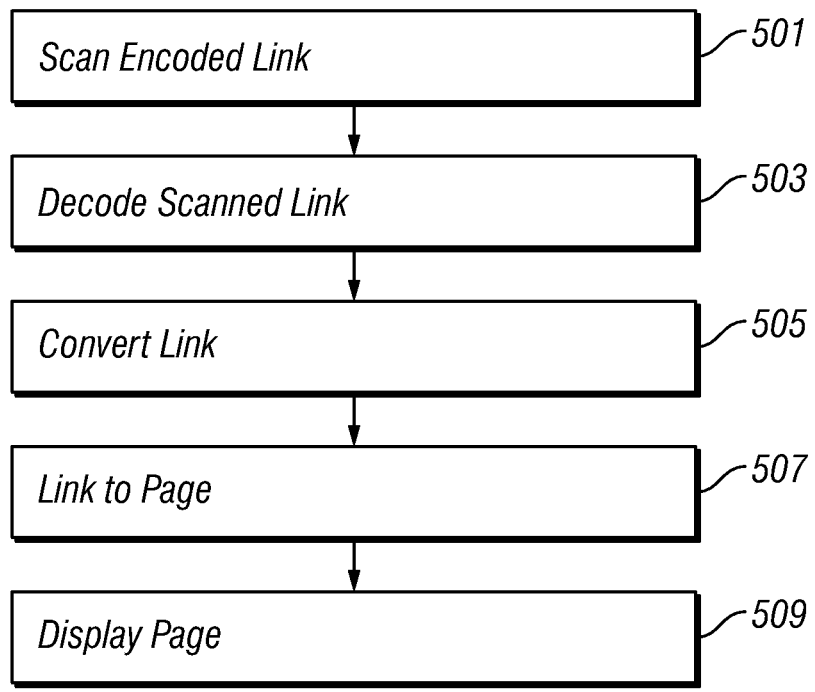
FIG. 5 is a flowchart of the operation of a cross-platform encoded link management system, according to other embodiments.

FIG. 5 is a flowchart of the operation of a cross-platform encoded link management system 101, according to other embodiments. The scanning module 307 of the cross-platform encoded link management system 101 on the mobile computing device 103 running a first mobile operating system scans 501 and decodes 503 an encoded link to a specific page in the app distribution site 305 for the second mobile operating system. As with the embodiments described in conjunction with FIG. 4, the specific page of the app distribution site 305 pertains to a specific app in the format of the second mobile operating system. The link converting module 309 converts 505 the link in the format specific to the second mobile operating system into a link to the same target in a format usable by the first mobile operating system. The mobile computing device 103 that runs the first mobile operating system uses the converted link to link 507 to the specific page in the app distribution site 305 for the second mobile operating system. Thus, the specific page in the app distribution site 305 for the second mobile operating system 305 is displayed 509 to the user, by the mobile computing device 103 that runs the first mobile operating system.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory or significant, and the mechanisms that implement the invention or its features may have different names, divisions and/or formats. The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:

1. A computer implemented method for enabling a user of a mobile computing device that runs a first mobile operating system to process encoded links to app distribution site pages for a second mobile operating system, the method comprising the steps of:

scanning, by the mobile computing device that runs the first mobile operating system, an encoded link to a specific page in the app distribution site for the second mobile operating system, wherein the specific page of the app distribution site pertains to a specific app in a format of the second mobile operating system;

decoding the scanned encoded link to the specific page in the app distribution site for the second mobile operating system, by the mobile computing device that runs the first mobile operating system;

gleaning at least one search term for locating at least one app in a format of the first mobile operating system, the at least one app in the format of the first mobile operating system corresponding to the specific app in the format of the second mobile operating system, wherein gleaning at least one search term for locating at least one app in a format of the first mobile operating system further comprises:

gleaning the at least one search term from the decoded link to the specific page of the app distribution site for the second mobile operating system;

searching, by the mobile computing device that runs the first mobile operating system, an app distribution site for the first mobile operating system, for the gleaned search terms; and locating, by the mobile computing device that runs the first mobile operating system, the at least one app in the format of the first mobile operating system corresponding to the specific app in the format of the second mobile operating system, responsive to the searching.

2. The method of claim 1 wherein gleaning at least one search term for locating at least one app in a format of the first mobile operating system further comprises:

gleaning a name of the specific app from the decoded link to the specific page of the app distribution site for the second mobile operating system.

3. The method of claim 1 wherein gleaning at least one search term for locating at least one app in a format of the first mobile operating system further comprises:

gleaning the at least one search term from the specific page of the app distribution site for the second mobile operating system.

4. The method of claim 3 wherein gleaning at least one search term from the specific page of the app distribution site for the second mobile operating system further comprises:

gleaning at least one search term from at least one component of the specific page from a group of page components consisting of: page text, page content, a page heading, a page title and a markup language description of a page.

5. The method of claim 1 wherein locating the at least one app in the format of the first mobile operating system corresponding to the specific app in the format of the second mobile operating system further comprises:

receiving at least one search result responsive to the search, the at least one search result providing user access to the at least one app in the format of the first mobile operating system corresponding to the specific app in the format of the second mobile operating system.

6. The method of claim 5 wherein receiving at least one search result providing user access to the at least one app in the format of the first mobile operating system further comprises:

receiving a single search result comprising a link to a specific page for an app in the format of the first mobile operating system corresponding to the specific app in the format of the second mobile operating system; and displaying the specific page for the app in the format of the first mobile operating system to the user.

7. The method of claim 5 wherein receiving at least one search result providing user access to the at least one app in the format of the first mobile operating system further comprises:

receiving a plurality of separate search results, each separate search result comprising a link to a separate page for a separate app in the format of the first mobile operating system corresponding to the specific app in the format of the second mobile operating system; and displaying the plurality of search results to the user.

8. The method of claim 7 further comprising:

augmenting the plurality of search results by performing at least one additional step from a group of steps consisting of:
- displaying reviews of each separate app in the format of the first mobile operating system;
- displaying empirical data concerning selections of apps in the format of the first mobile operating system made by other users;
- prompting the user to refine the search; and
- reordering the search results.

9. The method of claims 1 wherein:

the second mobile operating system comprises Android; and the encoded link to the specific page in the app distribution site for the second mobile operating system comprises a Quick Response ("QR") code encoding a link in an Android format to a page in an Android app distribution site for a specific Android app.

10. The method of claims 1 wherein:

the first mobile operating system comprises a mobile operating system from a group of mobile operating systems consisting of: iOS and Windows phone.

11. At least one non-transitory computer readable medium storing program code that when loaded into system memory and executed by a processor performs a method for enabling a user of a mobile computing device that runs a first mobile operating system to process encoded links to app distribution site pages for a second mobile operating system, the method comprising the steps of:

scanning, by the mobile computing device that runs the first mobile operating system, an encoded link to a specific page in the app distribution site for the second mobile operating system, wherein the specific page of the app distribution site pertains to a specific app in a format of the second mobile operating system;

decoding the scanned encoded link to the specific page in the app distribution site for the second mobile operating system, by the mobile computing device that runs the first mobile operating system;

gleaning at least one search term for locating at least one app in a format of the first mobile operating system, the at least one app in the format of the first mobile operating system corresponding to the specific app in the format of the second mobile operating system, wherein gleaning at least one search term for locating at least one app in a format of the first mobile operating system further comprises:

gleaning the at least one search term from the decoded link to the specific page of the app distribution site for the second mobile operating system;

searching, by the mobile computing device that runs the first mobile operating system, an app distribution site for the first mobile operating system, for the gleaned search terms; and locating, by the mobile computing device that runs the first mobile operating system, the at least one app in the format of the first mobile operating system corresponding to the specific app in the format of the second mobile operating system, responsive to the searching.

12. The at least one non-transitory computer readable medium of claim 11 wherein gleaning at least one search term for locating at least one app in a format of the first mobile operating system further comprises:

gleaning the at least one search term from the specific page of the app distribution site for the second mobile operating system.

13. The at least one non-transitory computer readable medium of claim 11 wherein locating the at least one app in the format of the first mobile operating system corresponding to the specific app in the format of the second mobile operating system further comprises:

receiving at least one search result responsive to the search, the at least one search result providing user access to the at least one app in the format of the first mobile operating system corresponding to the specific app in the format of the second mobile operating system.

14. The at least one non-transitory computer readable medium of claim 13 wherein receiving at least one search result providing user access to the at least one app in the format of the first mobile operating system further comprises:

receiving a single search result comprising a link to a specific page for an app in the format of the first mobile operating system corresponding to the specific app in the format of the second mobile operating system; and displaying the specific page for the app in the format of the first mobile operating system to the user.

15. The at least one non-transitory computer readable medium of claim 13 wherein receiving at least one search result providing user access to the at least one app in the format of the first mobile operating system further comprises:

receiving a plurality of separate search results, each separate search result comprising a link to a separate page for a separate app in the format of the first mobile operating system corresponding to the specific app in the format of the second mobile operating system; and displaying the plurality of search results to the user.

* * * * *